(12) United States Patent
Liu et al.

(10) Patent No.: US 11,727,915 B1
(45) Date of Patent: Aug. 15, 2023

(54) METHOD AND TERMINAL FOR GENERATING SIMULATED VOICE OF VIRTUAL TEACHER

(71) Applicants: Fujian TQ Digital Inc., Fuzhou (CN); Central China Normal University, Wuhan (CN)

(72) Inventors: Dejian Liu, Fuzhou (CN); Zhenhua Fang, Fuzhou (CN); Zheng Zhong, Wuhan (CN); Jian Xu, Wuhan (CN)

(73) Assignees: Fujian TQ Digital Inc., Fuzhou (CN); Central China Normal University, Wuhan (CN)

( * ) Notice: Subject to any disclaimer, the term of this patent is extended or adjusted under 35 U.S.C. 154(b) by 0 days.

(21) Appl. No.: 18/156,007

(22) Filed: Jan. 18, 2023

(30) Foreign Application Priority Data

Oct. 24, 2022 (CN) .......................... 202211305253.0

(51) Int. Cl.
*G10L 15/22* (2006.01)
*G10L 15/26* (2006.01)
(Continued)

(52) U.S. Cl.
CPC ............ *G10L 13/10* (2013.01); *G06F 40/284* (2020.01); *G06F 40/40* (2020.01);
(Continued)

(58) Field of Classification Search
CPC .......... G10L 15/00; G10L 15/22; G10L 15/26
See application file for complete search history.

(56) References Cited

U.S. PATENT DOCUMENTS

| | | | |
|---|---|---|---|
| 2021/0287657 | A1 | 9/2021 | Deng et al. |
| 2022/0360668 | A1* | 11/2022 | Brink ....................... G10L 15/22 |
| 2022/0364829 | A1* | 11/2022 | Wallack ................. G06V 20/20 |

FOREIGN PATENT DOCUMENTS

| | | |
|---|---|---|
| CN | 108038492 A | 5/2018 |
| CN | 108899049 A | 11/2018 |
| (Continued) | | |

OTHER PUBLICATIONS

Vanmassenhove, Eva, Joao P. Cabral, and Fasih Haider. "Prediction of Emotions from Text using Sentiment Analysis for Expressive Speech Synthesis." In SSW, pp. 21-26. 2016. (Year: 2016).*

(Continued)

*Primary Examiner* — Shreyans A Patel
(74) *Attorney, Agent, or Firm* — Westbridge IP LLC

(57) ABSTRACT

Disclosed are a method and a terminal for generating simulated voices of virtual teachers. Real voice samples of teachers are collected and converted into text sequences, and a text emotion polarity training set and a text tone training set are constructed according to the text sequences; a lexical item emotion model is constructed based on lexical items in the text sequences and is trained by using the emotion polarity training set, and word vectors, an emotion polarity vector, and a weight parameter are obtained by training; and the similarity between the word vector and the emotion polarity vector is calculated, and emotion features are extracted according to a similarity calculation result, a conditional vocoder is constructed according to the voice styles and emotion features to generate new voices with emotion changes. The method and the terminal contribute to satisfying the application requirements of high-quality virtual teachers.

10 Claims, 9 Drawing Sheets

---

S1. Collect real voice samples of teachers, convert the real voice samples into text sequences, and construct a text emotion polarity training set and a text tone training set according to the text sequences

↓

S2. Construct a lexical item emotion model based on lexical items in the text sequences, train the lexical item emotion model by using the text emotion polarity training set, calculate a similarity according to a word vector, an emotion polarity vector and a weight parameter obtained by training, extract emotion features according to a similarity calculation result, and construct voices with emotion changes based on the emotion features and voice features of the real voice samples

↓

S3. Obtain a feature vector of voice rhythm information according to the voices, generate voice style features, obtain texts to be synthesized, extract tone features of the texts to be synthesized by using the text tone training set, and generate the simulated voices of the texts to be synthesized based on the voice style features and the tone features

(51) Int. Cl.
  *G10L 13/10* (2013.01)
  *G10L 25/63* (2013.01)
  *G10L 25/18* (2013.01)
  *G10L 13/033* (2013.01)
  *G06F 40/284* (2020.01)
  *G10L 21/0208* (2013.01)
  *G06F 40/40* (2020.01)
  *G10L 13/047* (2013.01)

(52) U.S. Cl.
  CPC ........ *G10L 13/0335* (2013.01); *G10L 13/047* (2013.01); *G10L 21/0208* (2013.01); *G10L 25/18* (2013.01); *G10L 25/63* (2013.01)

(56) References Cited

FOREIGN PATENT DOCUMENTS

| | | | | |
|---|---|---|---|---|
| CN | 110245229 | A | | 9/2019 |
| CN | 110264991 | A | | 9/2019 |
| CN | 110427616 | A | | 11/2019 |
| CN | 110910898 | A | * | 3/2020 .......... B25J 11/0005 |
| CN | 111563379 | A | | 8/2020 |
| CN | 112820269 | A | | 5/2021 |
| CN | 113129862 | A | | 7/2021 |
| CN | 113658577 | A | | 11/2021 |
| CN | 113889074 | A | * | 1/2022 |
| CN | 114757182 | A | | 7/2022 |
| CN | 115098633 | A | * | 9/2022 |
| CN | 115631772 | A | * | 1/2023 |
| CN | 115662473 | A | * | 1/2023 |
| KR | 102402884 | B1 | * | 5/2022 |
| NO | 2022105545 | A1 | | 5/2022 |
| NO | 2022121181 | A1 | | 6/2022 |
| WO | WO-2022260432 | A1 | * | 12/2022 |

OTHER PUBLICATIONS

Cai et al. "Emotion controllable speech synthesis using emotion-unlabeled dataset with the assistance of cross-domain speech emotion recognition." In ICASSP 2021-2021 IEEE International Conference on Acoustics, Speech and Signal Processin (Year: 2021).*

First Office Action issued in counterpart Chinese Patent Application No. 202211305253.0, dated Mar. 16, 2023.

Franzoni et al., Emotional sounds of crowds: spectrogram-based analysis using deep learning, Multimedia Tools and Applications, https://doi.org/10.1007/s11042-020-09428-x, dated Aug. 17, 2020.

Huang et al., Development Status and Trend of Educational Robots, XDJYJS, vol. 27, No. 1, pp. 13-20, dated Nov. 30, 2017.

* cited by examiner

METHOD AND TERMINAL FOR GENERATING SIMULATED VOICE OF VIRTUAL TEACHER

CROSS-REFERENCE TO RELATED APPLICATIONS

This application claims priority to Chinese Patent Application No. 202211305253.0, filed on Oct. 24, 2022, the entire contents of which are incorporated herein by reference.

TECHNICAL FIELD

The present disclosure relates to the technical field of educational metaverse, in particular to a method and a terminal for generating simulated voices of virtual teachers.

BACKGROUND

The digital virtual human constructed by means of three-dimensional modeling, motion capture, real-time rendering, artificial intelligence, and other technologies can realize applications such as broadcasting, explanation, and accompanying with diverse styles, friendliness, and affection. Virtual teachers, as a typical application of the digital virtual human in education and teaching can enhance the teaching presence experience of teachers and students by combination of knowledge maps and emotion deduction. However, due to the limitation of computing resources, training models and cost budgets, it is difficult to provide the support of strong natural language processing ability. Nowadays, the virtual teachers have the defects of fixed images and monotonous timbres, which is not conducive to enhancing the emotional interaction between teachers and students, and lacks the humanistic care of real teachers. With the rise of the metaverse and the gradual deepening of its application in the education industry, the virtual teachers, as agent entities of real teachers in virtual space, can realize the common "presence" of their bodies, perception and consciousness. The virtual teachers who reproduce the voice styles of real teachers are conducive to reducing the sense of loneliness and separation of students in the teaching process, and have broad application prospects in future classroom teaching, online learning, informal place learning and other application scenarios.

At present, there are still many problems in the generation of simulated voices of the virtual teachers, which are as follows:

(1) The timbres are fixed, and existing virtual teacher systems mostly use voice synthesis methods to obtain the voice of a real person through natural language processing and training. Due to many steps and relatively high cost, it is difficult for users to replace the voice with the voices of other teachers, so that the openness of the systems is not strong.

(2) The voice style is not obvious; and due to the constraints of learning, training time and computational cost, the existing virtual teacher systems mostly use the voices of stars or idols with affinity as samples, which have a low degree of correlation with the voices of the teachers that students come into contact with in daily, and are not easy to awaken the sense of presence in learning.

(3) The ability of rapid synthesis is not strong, and the number of students' subject teachers is large. It is necessary for enabling synthesized voice styles and emotional features of all the teachers to be consistent with those of real people thereof. It should be considered that under the cloud-edge-end architecture, the rapid synthesis of voice based on a natural language processing system is realized.

The above defects limit the application of virtual teachers in various fields of education.

SUMMARY

The technical problem to be solved by the present disclosure is to provide a method and a terminal for generating simulated voices of virtual teachers, which can add emotion features and voice styles to the voices of the virtual teachers, thereby realizing the simulated voices of the virtual teachers.

In order to solve the above technical problem, the technical solution adopted by the present disclosure is as follows:

the method for generating simulated voices of virtual teachers includes the following steps:

collecting real voice samples of teachers, converting the real voice samples into text sequences, and constructing a text emotion polarity training set and a text tone training set according to the text sequences;

constructing a lexical item emotion model based on lexical items in the text sequences, training the lexical item emotion model by using the text emotion polarity training set, calculating a similarity according to a word vector, an emotion polarity vector and a weight parameter obtained by training, extracting emotion features according to a similarity calculation result, and constructing voices with emotion changes based on the emotion features and voice features of the real voice samples; and obtaining a feature vector of voice rhythm information according to the voices, generating voice style features, obtaining texts to be synthesized, extracting tone features of the texts to be synthesized by using the text tone training set, and generating the simulated voices of the texts to be synthesized based on the voice style features and the tone features.

In order to solve the above technical problem, another technical solution adopted by the present disclosure is as follows:

the terminal for generating simulated voices of virtual teachers includes a memory, a processor, and a computer program stored on the memory and runnable on the processor; and the processor implements all steps of the above-mentioned method for generating simulated voices of virtual teachers when executing the computer program.

The present disclosure has the beneficial effects that: real voice samples of teachers are collected, and are converted into text sequences, and thus, a text emotion polarity training set and a text tone training set are constructed according to the text sequences; a lexical item emotion model is constructed based on lexical items in the text sequences, and is trained by using the emotion polarity training set, and a word vector, an emotion polarity vector and a weight parameter are obtained by training; and the similarity between the word vector and the emotion polarity vector is calculated, and emotion features are extracted according to a similarity calculation result, and thus, a conditional vocoder is constructed according to the voice styles and emotion features to generate new voices with emotion changes. A feature vector of voice rhythm information in the new voices is extracted, and voice style features and coding states thereof are generated; then, according to the texts to be synthesized and the voice features, new voice sequences are generated and outputted. With the wide application of virtual teachers in teaching scenes such as classroom teaching, online teaching and campus activities, the method and the terminal contribute to extracting and synthesizing the voice features and emotion styles of teaching administrators, teachers and related users, and satisfy the application requirements of high-quality virtual teachers.

DETAILED DESCRIPTION OF THE EMBODIMENTS

In order to explain the technical contents, achieved objectives and effects of the present disclosure, detailed description will be made below in combination with embodiments and accompanying drawings.

Figure 1:
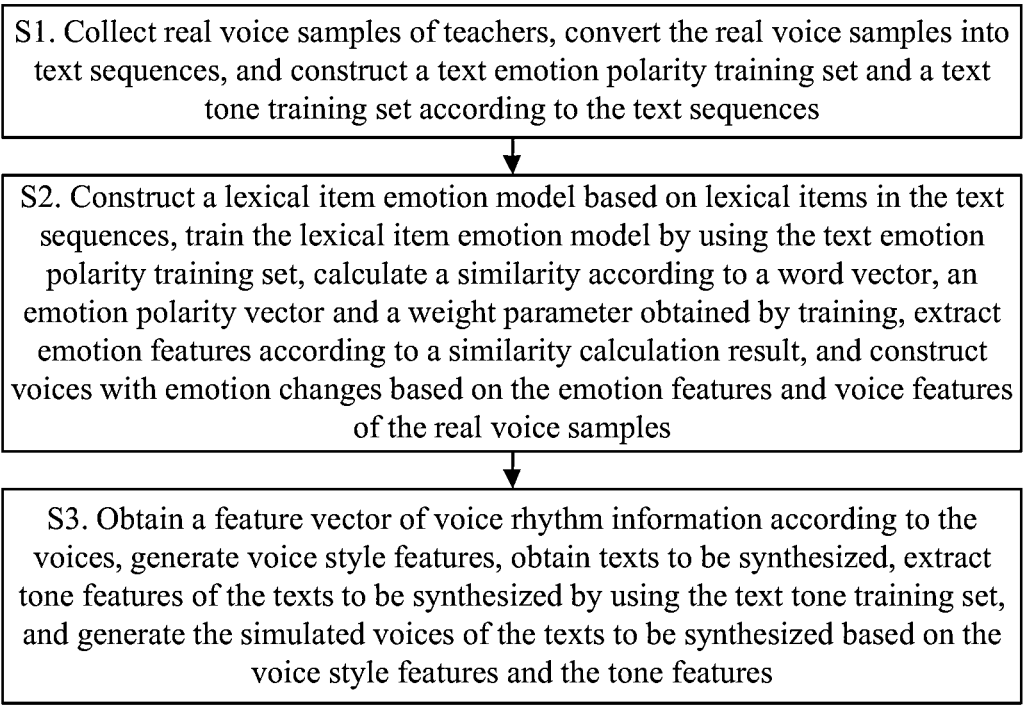
FIG. 1 is a flowchart of a method for generating simulated voices of virtual teachers according to the embodiments of the present disclosure.

Referring to FIG. 1, an embodiment of the present disclosure provides a method for generating simulated voices of virtual teachers, which includes the following steps:

collecting real voice samples of teachers, converting the real voice samples into text sequences, and constructing a text emotion polarity training set and a text tone training set according to the text sequences;

constructing a lexical item emotion model based on lexical items in the text sequences, training the lexical item emotion model by using the text emotion polarity training set, calculating a similarity according to a word vector, an emotion polarity vector and a weight parameter obtained by training, extracting emotion features according to a similarity calculation result, and constructing voices with emotion changes based on the emotion features and voice features of the real voice samples; and obtaining a feature vector of voice rhythm information according to the voices, generating voice style features, obtaining texts to be synthesized, extracting tone features of the texts to be synthesized by using the text tone training set, and generating the simulated voices of the texts to be synthesized based on the voice style features and the tone features.

It can be seen from the above description that the present disclosure has the following beneficial effects: real voice samples of teachers are collected and converted into text sequences, and thus, a text emotion polarity training set and a text tone training set are constructed according to the text sequences; a lexical item emotion model is constructed based on lexical items in the text sequences, and is trained by using the emotion polarity training set, and a word vector, an emotion polarity vectors and a weight parameter are obtained by training; and the similarity between the word vector and the emotion polarity vector is calculated, and emotion features are extracted according to a similarity calculation result, and thus, a conditional vocoder is constructed according to the voice styles and emotion features to generate new voices with emotion changes. The feature vector of voice rhythm information in the new voices is extracted, and voice style features and coding states thereof are generated; then, according to the texts to be synthesized and the voice features, new voice sequences are generated and outputted. With the wide application of virtual teachers in teaching scenes such as classroom teaching, online teaching and campus activities, the method and the terminal contribute to extracting and synthesizing the voice features and emotion styles of teaching administrators, teachers and related users, and satisfy the application requirements of high-quality virtual teachers.

Further, the converting the real voice samples into text sequences includes:

denoising and editing the real voice samples, and then saving a processing result as a WAV file;

weighting and framing voice signals in the WAV files, and smoothing the voice signals by windowing; and acquiring text sequences corresponding to the voice signals by using a voice conversion algorithm, filtering lexical items in the text sequences, and dividing the filtered text sequences into different paragraphs by using a segmentation algorithm.

It can be seen from the above description that the real voice samples are preprocessed by denoising, editing, segmentation, etc., which can facilitate the subsequent generation of a text training set based on the preprocessed texts.

Further, the constructing a text emotion polarity training set according to the text sequences includes:

removing stop words, punctuation marks and low-frequency lexical items of lexical item sequences in the text sequences, correcting grammatical errors and spelling errors of the text sequences, and labeling the parts of speech of the lexical items;

acquiring emotion word lists and emotion rules of voices, and labeling the emotion polarities of the lexical items by combining the categories of the lexical items and context lexical items thereof; and constructing the text emotion polarity training set according to the emotion polarities of the lexical items and context lexical items thereof.

It can be seen from the above description that the categories of lexical items in text sequences and context lexical items thereof are used to label the emotion polarities, so that a text emotion polarity training set can be constructed by taking the emotion polarities of lexical items and context lexical items thereof as samples.

Further, the constructing a text tone training set according to the text sequences includes:

correcting punctuation marks of the text sequences divided into different paragraphs, and configuring corresponding tones for the corrected text sequences:

labeling the text sequences with Pinyin according to the tones of the text sequences; and constructing the text tone training set according to the tones and Pinyin of the text sequences in different paragraphs.

It can be seen from the above description that the text sequences are labeled with tones and then labeled with Pinyin, so that the text tone training set can be constructed by using the tones and Pinyin of the text sequences of different paragraphs.

Further, the constructing a lexical item emotion model based on lexical items in the text sequences, and training the lexical item emotion model by using the text emotion polarity training set includes:

extracting lexical items containing emotion polarities from the text sequences, and constructing a mapping relationship between the lexical items and lexical frequencies based on the extracted lexical items and the lexical frequencies thereof;

constructing the lexical item emotion model based on a neural network and the mapping relationship between the lexical items and the lexical frequencies, and calculating word vectors according to the lexical item emotion model; and training the lexical item emotion model by using the text emotion polarity training set to an emotion polarity vector and a weight parameter.

It can be seen from the above description that the mapping relationship of lexical items and lexical frequencies can be obtained according to the lexical items containing emotion polarities and the lexical frequencies thereof, thus, the lexical item emotion model is established based on a neural network and the mapping relationship, and a word vector is calculated; and the text emotion polarity training set is used to train the lexical item emotion model, so that an emotion polarity vector and a weight parameter, and the subsequent calculation of the similarity of the above two vectors based on the weight parameter is facilitated.

Further, the calculating a similarity according to a word vector, an emotion polarity vector and a weight parameter obtained by training, and extracting emotion features according to a similarity calculation result includes:

calculating the similarity between the word vector and the emotion polarity vector;

$$\rho(e_j, q_j) = \frac{\text{cov}(e_j, q_j)}{\sigma(e_j) \times \sigma(q_j)};$$

Where cov represents a covariance, σ represents a standard deviation, $e_j$ represents a word vector, and $q_j$ represents an emotion polarity vector;

determining a similarity category according to the similarity between the word vector and the emotion polarity vector, and fusing the word vectors and the emotion polarity vectors according to the similarity category; and according to the similarity between the word vector and the emotion polarity vector, acquiring an emotion vector by a corresponding operation method, converting lexical item sequences into emotion polarity vector sequences, extracting the features of vector sequences by using a circulation neural network layer, nonlinearly transforming the features of the vector sequences by two fully-connected layers, compressing, and generating emotion features.

It can be seen from the above description that the similarity between the word vector and the emotion polarity vector is calculated, the word vector and emotion polarity vector are fused according to the similarity category, and the emotion features are compressed and generated by the neural network, and thus, the subsequent obtaining of the voices with emotion changes is facilitated.

Further, the constructing voices with emotion changes based on the emotion features and voice features of the real voice samples includes:

extracting the voice features of the real voice samples by using fast Fourier transform, nonlinear transform, and filter banks;

constructing a conditional model of a vocoder by taking the emotion features and the voice features as preconditions and input variables of the neural network vocoder, and using the vocoder to generate voices with emotion changes.

It can be seen from the above description that after the voice features of the real voice samples are extracted, a conditional model of a vocoder is constructed by taking the emotion features and voice features as preconditions and input variables of the neural network vocoder, and thus, the voices with emotion changes are generated by the vocoder in this way.

Further, the obtaining a feature vector of voice rhythm information according to the voices, and generating voice style features include:

converting the voice rhythm information into a rhythm feature vector by using a two-dimensional convolution neural network, batch standardization, a correction linear unit and a single-layer circulation neural network layer;

mining multi-rhythm features in the voices by using a pair of multi-cycle neural network layers, giving weights to style features by using an attention mechanism, and acquiring a style coding vector; and according to the style coding vector, generating voice style features and coding states thereof.

Further, the obtaining texts to be synthesized, extracting tone features of the texts to be synthesized by using the text tone training set, and generating the simulated voices of the texts to be synthesized based on the voice style features and the tone features include:

constructing a tone prediction model, training the tone prediction model by using the text tone training set, updating weight parameters in the tone prediction model by using an error back-propagation algorithm, and mapping Pinyin sub-labels to a vector with implied tone features;

capturing the fluctuation changes of tones by hollow convolution, and converting into a tone feature coding state with fixed dimensions by using a fully-connected layer;

mining text feature information by using a double-layer circulation neural network layer, and outputting feature vectors of the texts to be synthesized by the fully-connected connection layer and a modified linear unit; and giving weights to the coding states of voice style features and tone features by using an attention mechanism, fusing the coding states by an addition operation, and according to the texts to be synthesized and simulated voice features, generating voice sequences with voice styles and emotion features.

It can be seen from the above description that the feature vector of voice rhythm information is extracted by using a combination method, the weight is given to the style feature by using the attention mechanism, the style coding vector is extracted, and the voice style feature and a coding state thereof are generated; the fluctuation changes of tones are captured by hollow convolution, the coding state of tone features is obtained, and the fusion coding state of voices and tones is processed by an addition operation; according to the texts to be synthesized and the voice features of the real teacher, new voice sequences are generated and outputted, and thus, the emotion features and voice styles can be added to the voices of the virtual teacher.

Figure 2:
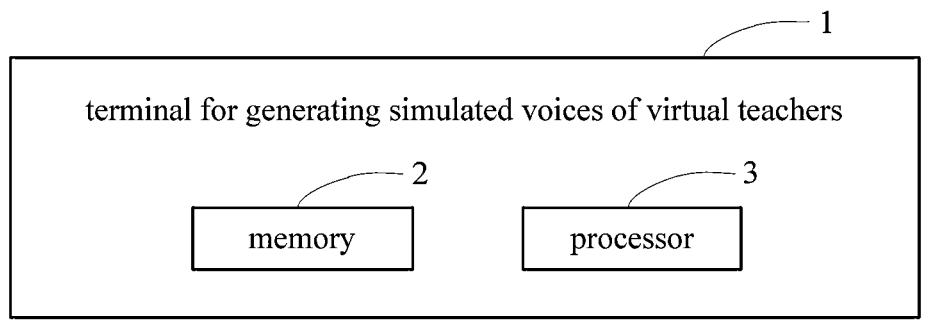
FIG. 2 is a schematic diagram of a terminal for generating simulated voices of virtual teachers according to the embodiments of the present disclosure.

Referring to FIG. 2, another embodiment of the present disclosure provides a terminal for generating simulated voices of virtual teachers, which comprises a memory, a processor, and a computer program stored on the memory and runnable on the processor; and the processor implements the above-mentioned method for generating simulated voices of virtual teachers when executing the computer program.

The method and the terminal for generating simulated voices of virtual teachers provided by the present disclosure are suitable for the generation and application of voice emotions and style features of real teachers in the educational metaverse, and will be explained by specific embodiments below.

Embodiment I

Figure 3:
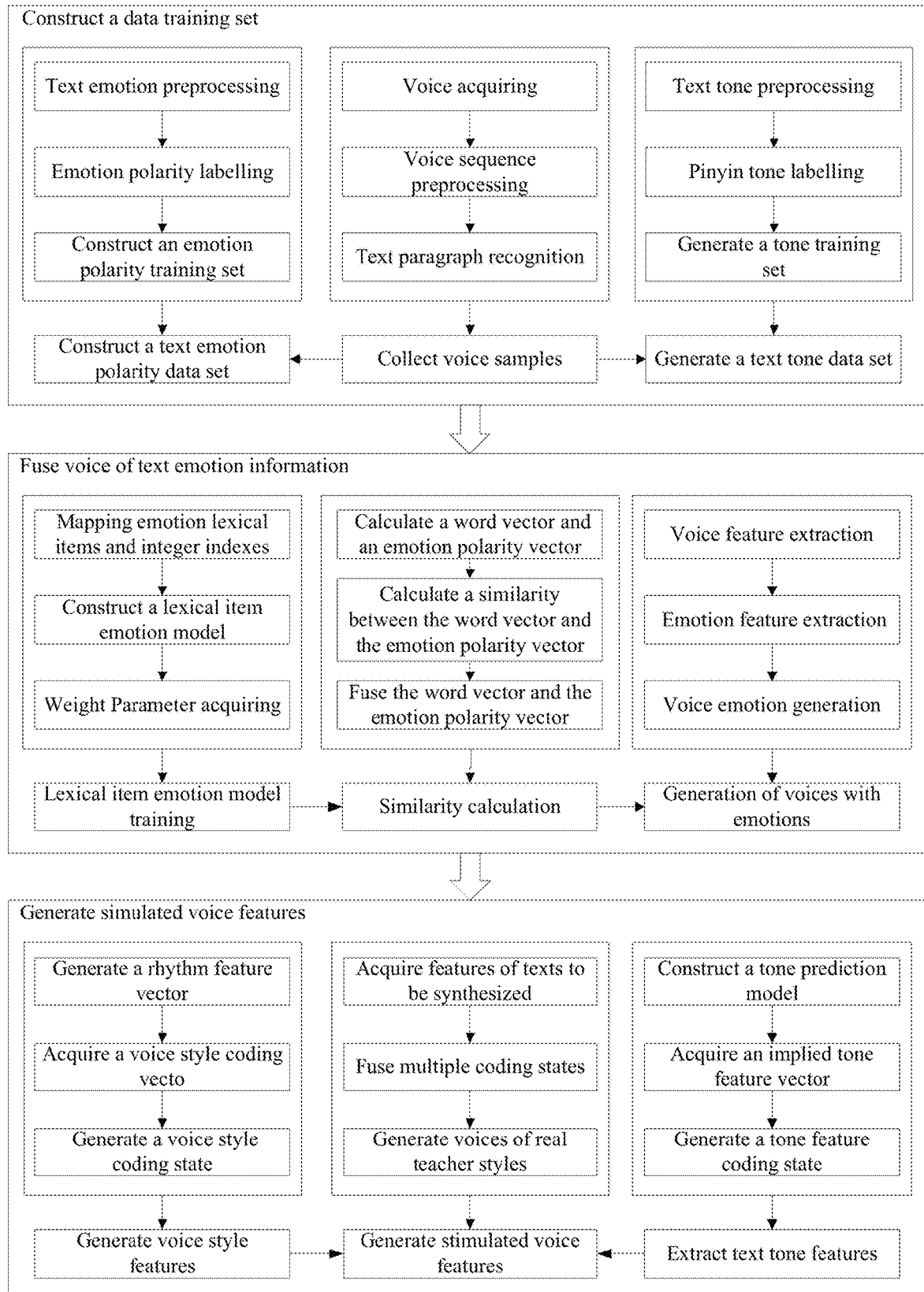
FIG. 3 is a flowchart of specific steps of a method for generating simulated voices of virtual teachers according to the embodiments of the present disclosure.

Referring to FIG. 1 and FIG. 3, a method for generating simulated voices of virtual teachers includes the following steps:

S1. Collecting real voice samples of teachers, converting the real voice samples into text sequences, and constructing a text emotion polarity training set and a text tone training set according to the text sequences.

S11. Collecting real voice samples of teachers, denoising and editing the real voice samples, and then saving a processing result as a WAV file.

Specifically, according to the set sampling rate, under the condition of interference-free recording, real voice samples of teachers with a preset duration are collected, noise in the real voice samples is eliminated by using a denoising algorithm, the real voice samples are edited or processed by using the labeling, deleting, inserting and moving functions of audio editing software, and an editing or processing result is saved as a waveform voice file in way format.

S12. Weighting and framing voice signals in the WAV file, and smoothing the voice signals by windowing.

Figure 4:
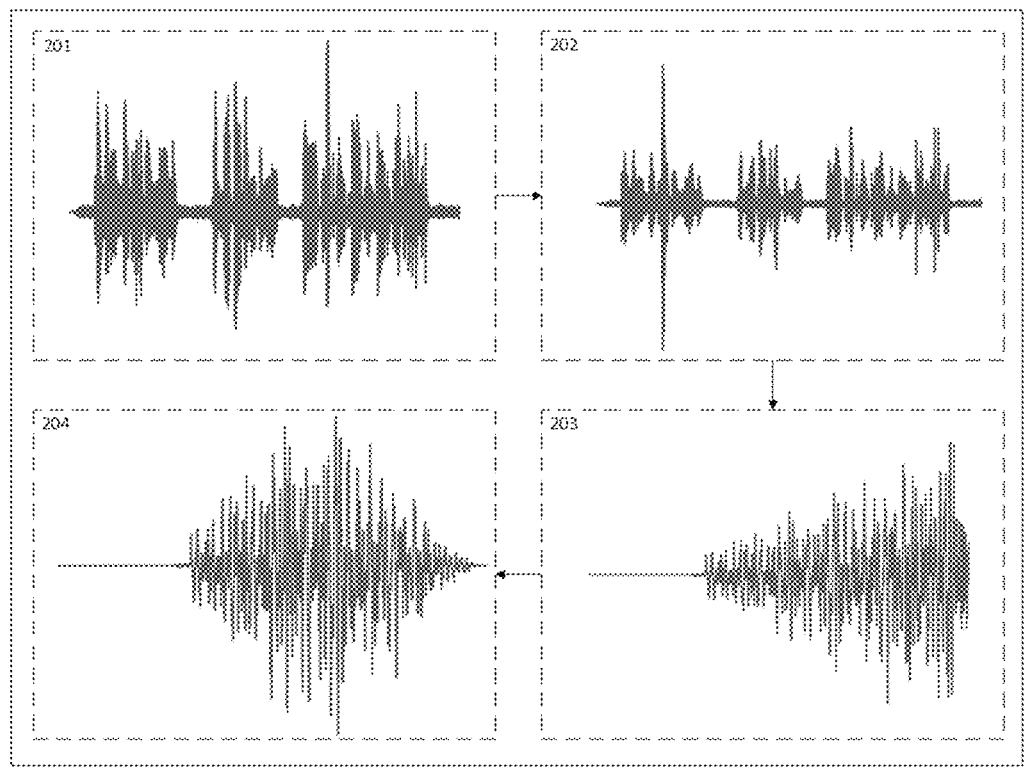
FIG. 4 is an effect diagram of voice sequence preprocessing according to the embodiments of the present disclosure.

Specifically, referring to FIG. 4, in which 201 is the acquired digital audio waveform, 202 is the waveform after pre-emphasis processing, 203 is the waveform after framing, and 204 is the waveform after windowing. The voice signal in the WAV file is loaded, and the digitized voice sequence is obtained. The conflict between the high-end frequency and the amplitude fluctuation caused by a glottal pulse in the voice sequence is solved by an emphasis operation. The frame length is set to a fixed value, and the voice sequence is processed by a framing operation. A windowing operation is used to smooth the transition between frames.

S13. Acquiring text sequences corresponding to the voice signals by using a voice conversion algorithm, filtering lexical items in the text sequences, and dividing the filtered text sequences into different paragraphs by using a segmentation algorithm.

The voice sequence is automatically converted into the text sequence by using a voice conversion algorithm, for example, the text of collecting, identifying and converting real voice samples of a teacher: "Don't all students like durian? Teacher loves durian very much! Because durain can be used for making many valuable products".

According to the conversion rules of a voice recognition text, the text sequence is divided into different paragraphs by a segmentation algorithm, and each paragraph is labeled with a logo <p>. The labeling result is "<p>Don't all students like durian? Teacher loves durian very much! Because durain can be used for making many valuable products.</p>".

Regular expressions are used to identify invalid and repeated lexical items, the lexical items are replaced with a common identifier <UNK> in natural language processing, and the result is saved in .txt text format.

S14. Constructing a text emotion polarity data set.

S141. Removing stop words, punctuation marks and low-frequency lexical items of lexical item sequences in the text sequences, correcting grammatical errors and spelling errors of the text sequences, and labeling the parts of speech of the lexical items.

In the present embodiment, specific steps are as follows.

S1411. Correcting grammatical errors and spelling errors of paragraph texts, and changing "Liek" to "Like".

S1412. Segmenting a paragraph into lexical item sequences by using a word segmentation algorithm. In the present embodiment, "/" is used for segmentation to obtain "don't/all/students/like/durian/?/Teacher/loves/durian/very much/!/Because/durain/can/be used for/making/many/valuable/products/".

S1413. According to a stop word dictionary and a lexical frequency statistics threshold, removing stop words, punctuation marks and low-frequency lexical items in the lexical item sequences to obtain "don't/all/students/like/durian//teacher/loves/durian/very much/be used for/making/many/valuable/products".

S1414. Using a part-of-speech labelling algorithm to label the parts of speech of lexical items, for example, "all (adjective) students (nouns) do not (negative words) like (verb) durian (noun) teacher (noun) loves (verb) durian (noun) very much (adverb) durian (noun) is used for making (verb) many (numeral) valuable (adjective) products (noun)".

S1415. Retaining lexical items of adjectives, verbs, adverbs, and negative words related to emotion polarities, and eliminating the lexical items of other parts of speech. The processed sequence is "all (adjective) do not (negative word) like (verb) very much (adverb) love (verb) making (verb) valuable (adjective)".

S1416. Using adjectives and verbs "like", "love", "making" and "valuable" as emotion words, and using adverbs and negatives words "all", "very much" and "do not" as corrections to the degree and polarities of emotion words.

S142. Acquiring emotion word lists and emotion rules of voices, and labeling the emotion polarities of the lexical items by combining the categories of the lexical items and context lexical items thereof.

Specifically, emotion word lists are loaded, the word list to which lexical items belong is comprehensively judged, and each lexical item is labeled with an emotion polarity. If the lexical item belongs to multiple word lists, the word list to which lexical items belong is comprehensively judged according to the emotion rules of voices in the teaching scenes, and the lexical items are labeled with five emotion polarity categories being high positive, low positive, high negative, low negative, and neutral in combination with the lexical items and the content part-of-speech categories.

In the present embodiment, the emotion words are labeled with the emotion polarities by adopting the following steps:

S1421. Judging the emotion words, "like" and "love" belong to positive emotion words in the positive word list, and "have" and "make" are not in the positive word list and the passive word list, and are classified as neutral emotion words.

S1422. Assigning values to the emotion polarities: assigning 1, 0, −1, and −1 to positive words, neutral words, passive words and negative words respectively, $S_{like}=1$, $S_{love}=1$, $S_{have}=0$, $S_{make}=0$, and $S_{no}=-1$; and assigning different numerical multiples such as $S_{both}=2$, $S_{very\ much}=3$ to adverbs of degree according to the degree of modification.

S143. Composite processing. If the emotion word is a positive word or a passive word, the lexical item of a non-emotion word between the emotion word and the previous emotion word is searched, and if the result is empty, the composite processing is not performed; if the search result is not empty, processing is performed separately; if the emotion word is a negative word, $S=S*S_{negative\ word}$; and if the emotion word is an adverb of degree, $S= S*S_{adverb\ of\ degree}$.

For example, if the adverb of degree "all" and the negative word "don't" are before the emotion word "like", $S_{like}=S_{like}*S_{don't}*S_{all}=1*(-1)*2=-2$; there is only one adverb of degree before "love", $S_{love}= S_{love}*S_{very\ much}=1*3=3$.

S1424: According to the range of an emotion polarity value S, labeling the emotion polarity of the emotion word:

$$S \in \begin{cases} (2, +\infty), & \text{strong positivity} \\ (0, 2], & \text{weak positivity} \\ [0], & \text{neutral} \\ [-2, 0), & \text{weak passivity} \\ (-\infty, -2), & \text{strong passivity} \end{cases} ;$$

In the above emotion sequence, there is "don't" before "like", so "like" is labeled with a strong passive emotion polarity; and there is "don't" before "love", so "love" is labeled with a strong positive emotion polarity.

S143. Constructing the text emotion polarity training set according to the emotion polarities of the lexical items and context lexical items thereof.

Specifically, according to the feature that the emotion polarity of the lexical item depends on context information, a supervised learning training sample is constructed. The training sample is divided into the preceding text and the next text. The emotion word labeled with the emotion polarity is introduced as the next text of the training set, and the emotion word with the emotion polarity to be acquired is used as the preceding text of the training set. According to the learning effect, the training sample set is gradually expanded.

Figure 5:
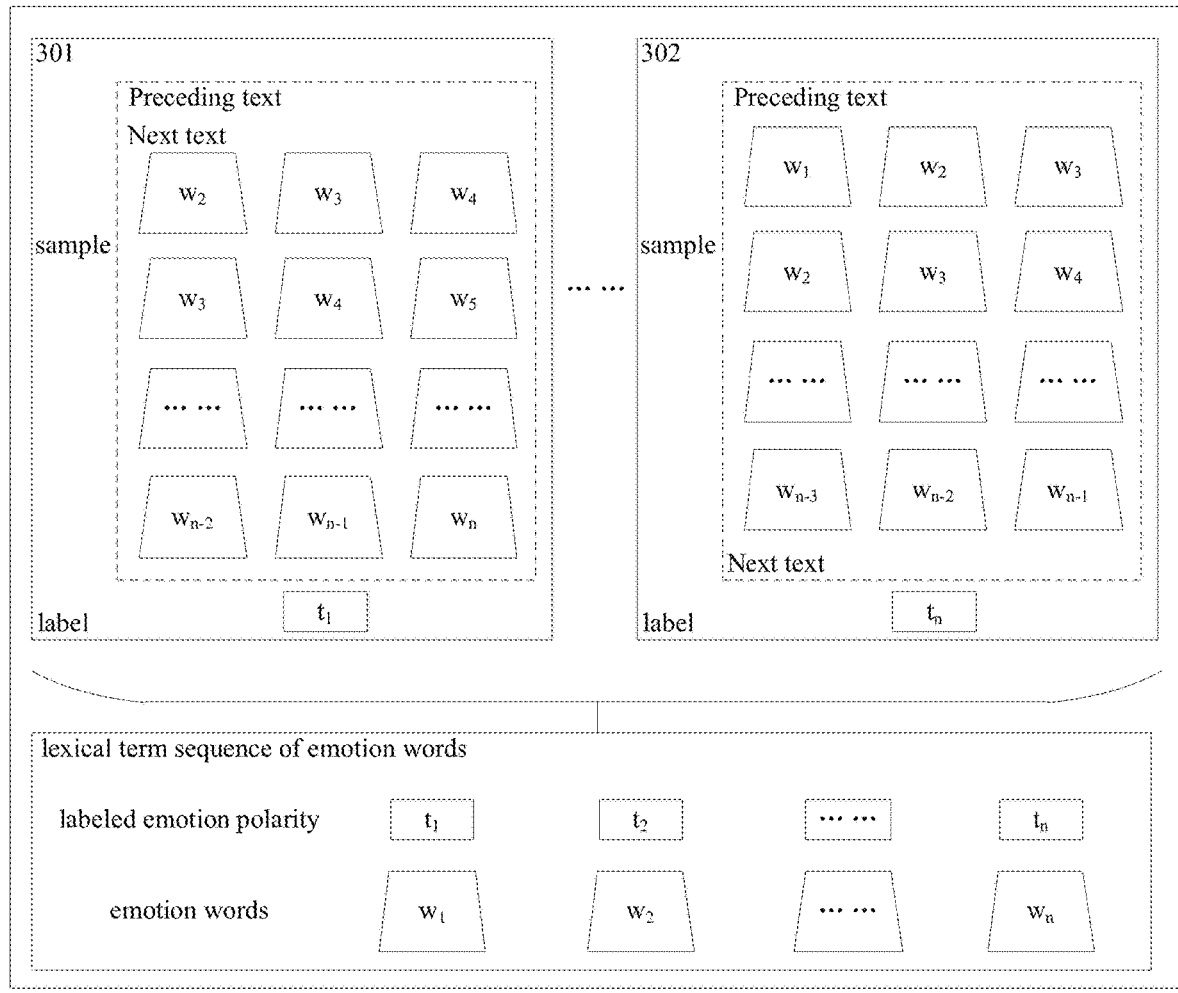
FIG. 5 is a flow diagram of emotion polarity training set construction according to the embodiments of the present disclosure.

In the present embodiment, referring to FIG. 5, specific steps of constructing an emotion polarity training set are as follows:

S1431. Loading a lexical item sequence {w1,w2, . . . , wn} of emotion words and a labeled emotion polarity {t1, T2, . . . , TN}.

S1432. Constructing training samples by using emotion words and emotion polarities thereof, taking the emotion word to be predicted in the emotion lexical item sequence as a dividing point, and dividing the lexical item sequence into the preceding text and the next text.

S1433. Setting the size of a convolution kernel to be 3 and the step size to be 1, obtaining three emotion words as a convolution processing sequence from the preceding text and the next text respectively according to the order of the lexical item sequence, and sliding the window with the step size of 1 to obtain the next convolution processing sequence. When the length of the convolution processing sequence is less than 3, the current emotion words to be predicted are used as supplements.

S15. Generating a text tone data set.

S151. Correcting punctuation marks of the text sequences divided into different paragraphs, and configuring corresponding tones for the corrected text sequences.

Specifically, according to the usage specification of punctuation marks, the irregular punctuation marks in the segmented texts are corrected, and question marks, exclamation marks, pause marks and emphasis marks are set as a predefined set of punctuation marks. According to the changes of rising tones, falling tones and tones corresponding to all punctuation marks in the set, the punctuation marks that do not belong to the predefined set of punctuation marks are replaced with commas.

S152. Labeling the text sequences with Pinyin according to the tones of the text sequences.

Specifically, an automatic Chinese character tone labeling tool is developed, and Chinese characters are labeled with Pinyin in turn according to segmentation marks. According to the labeling standard of Chinese Pinyin, a set of automatic Chinese character tone labeling tool is developed. According to the segmentation marks, the Chinese characters of each paragraph of text are labeled with Pinyin. The first, second, third and fourth tones are placed at the back of the Pinyin, and light tones are expressed by spaces. The ampersand (&) is used to separate Pinyin labels and punctuation marks, such as "Tong (tong2) Xue (xue2) Men (men) Dou (dou1) Bu (bu4) Xi (xi3) Huan (huan1) Liu (liu1) Lian (lian2) Ma (ma) &?".

The tone and Pinyin labeling result is saved as a file in a .txt format.

S153. Constructing the text and tone training set according to the tones and Pinyin of the text sequences in different paragraphs.

Specifically, the training samples and labels thereof are divided according to punctuation marks, and special labels are added to the samples containing polyphonic characters. A tone and Pinyin labeling sequence is loaded; separators are removed; the tone and Pinyin labeling sequence is divided into a plurality of subsequence training samples; punctuation marks at the ends of subsequences are taken as labels of the training samples; a tone training set is generated; and polyphonic characters and corresponding tones thereof are extracted from the training samples, which are labeled as samples containing polyphonic characters.

S2. Constructing a lexical item emotion model based on lexical items in the text sequences, training the lexical item emotion model by using the text emotion polarity training set, calculating a similarity according to a word vector, an emotion polarity vector and a weight parameter obtained by training, extracting emotion features according to a similarity calculation result, and constructing voices with emotion changes based on the emotion features and voice features of the real voice samples.

S21. Extracting lexical items containing emotion polarities from the text sequences, and constructing a mapping relationship between the lexical items and lexical frequencies based on the extracted lexical items and the lexical frequencies thereof.

In the present embodiment, according to the statistical results of lexical frequencies, the lexical items less than the threshold value are eliminated, and the mapping relationship is constructed for the remaining lexical items in the order of lexical frequencies from big to small.

Specifically, a data vectorization algorithm is used to screen out the lexical items containing emotion polarity information, and a lexical frequency statistics algorithm is used to count the frequency of emotion lexical items in the collected voice. The threshold value of lexical frequency statistics is set, and the lexical items, the lexical frequency of which is less than the threshold value, are eliminated. The mapping between the emotion lexical items and integer indexes is constructed for the remaining lexical items in the order of lexical frequencies from big to small.

S22. Constructing the lexical item emotion model based on the neural network and the mapping relationship between the lexical items and the lexical frequencies, and calculating a word vector according to the lexical item emotion model.

Specifically, a word embedding layer, a one-dimensional convolution neural network, a circulation neural network layer, a fully-connected layer and a normalized exponential function are stacked in sequence according to the output and input specifications of front and back network layers in combination with the serial modeling sequence, the lexical item emotion model is constructed, the emotion polarity training sample is used as the input variable of the model, and the emotion polarity of the lexical item is used as the output result.

Figure 6:
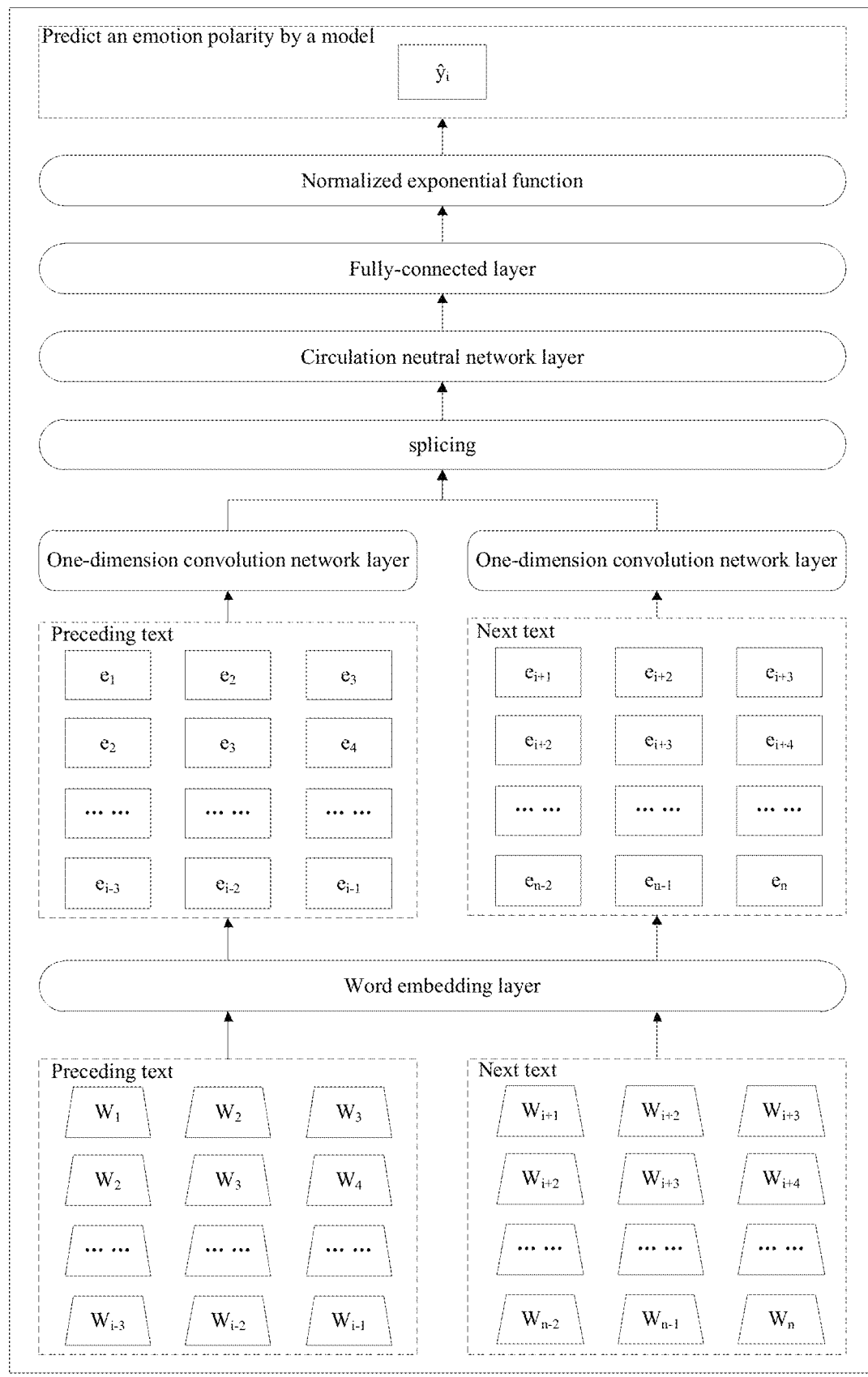
FIG. 6 is a flow diagram of lexical item emotion model construction according to the embodiments of the present disclosure.

In the present embodiment, referring to FIG. 6, the specific steps of constructing a lexical item emotion model are as follows.

S2121. Loading a lexical item sequence $\{w_1, w_2, \ldots, w_n\}$ of emotion words, and using an emotion word $w_i$, to be predicted which has been labeled with an emotion polarity $t_i$ to respectively obtain the preceding text $\{w_1, w_2, w_3\}$ $\{w_2, w_3, w_4\} \ldots \{w_{i-3}, w_{i-2}, w_{i-1}\}$ and next text $\{w_{i+1}, w_{i+2}, w_{i+3}\}$ $\{w_{i+2}, w_{i+3}, w_{i+4}\} \ldots \{w_{n-2}, w_{n-1}, w_n\}$ of the training sample, the label of the training sample being $t_i$.

S2122. According to the mapping relationship between the emotion lexical items and the integer indexes, respectively mapping the emotion lexical items in the preceding next and the next text of the training sample into two integer sequences of preceding text $\{num_1, num_2, num_3\}$ $\{num_2, num_3, num_4\} \ldots \{num_{i-3}, num_{i-2}, num_{i-1}\}$ and next text $\{num_{i+1}, num_{i+2}, num_{i+3}\}$ $\{num_{i+2}, num_{i+3}, num_{i+4}\} \ldots \{num_{n-2}, num_{n-1}, num_n\}$.

S2123. Representing a weight matrix of a word embedding layer as n sets of row vectors $e_1, e_2, \ldots, e_i, \ldots, e_n$, wherein $e_i$ represents a word vector of $w_i$, using one-hot coding to represent integer values in an integer sequence as an n-dimensional vector with only one item being 1 and the rest being all 0, for example, representing $num_i$ as an n-dimensional vector $(0, 0, \ldots, 1, \ldots, 0)$ with the i-th position being 1, and calculating the word vector of $w_i$:

$$e_i = (0, 0, \ldots, 1, \ldots, 0) \times \begin{pmatrix} e_1 \\ e_2 \\ \ldots \\ e_i \\ \ldots \\ e_n \end{pmatrix};$$

S2124. According to the integer indexes of the preceding text and the next text of the training sample, respectively converting lexical items of emotion words in the preceding text and the next text into word vectors containing emotion information to obtain $\{e_1, e_2, e_3\}$ $\{e_2, e_3, e_4\} \ldots \{e_{i-3}, e_{i-2}, e_{i-1}\}$ and $\{e_{i+3}, e_{i+2}, e_{i+3}\}$ $\{e_{i+2}, e_{i+3}, e_{i+4}\} \ldots \{e_{n-2}, e_{n-1}, e_n\}$.

S2125. Using two one-dimensional convolution neural networks to mine the emotion information in the preceding text and the next text respectively, splicing processing results and using a recurrent neural network to capture $w_i$ emotion polarity information implied in the preceding text and the next text, and after passing through a fully-connected layer and a normalized exponential function, outputting an emotion polarity probability distribution vector $\hat{y}_i$ of a model-predicted emotion word $w_i$.

S213. Using an emotion polarity training set to train the lexical item emotion model to obtain training results and weight parameters.

An initialization algorithm is used to assign values for weights and threshold parameters in the lexical item emotion model. Based on the emotion polarity training set, a gradient descent algorithm is used to update the weight parameters iteratively, and a model-predicted accuracy threshold is set. When the accuracy of the lexical item emotion model reaches the threshold value, model training is stopped, and the model and learned weight parameters are saved in a. ckpt file. The specific steps of the gradient descent algorithm to update the weight and threshold parameters are as follows.

S2131. Defining a neuron as a basic unit of calculation in the neural network, and using a Xavier parameter initialization algorithm to initialize a weight and a threshold.

$$weight_{initialization} \sim U\left[-\frac{\sqrt{6}}{\sqrt{n_{in} + n_{out}}}, \frac{\sqrt{6}}{\sqrt{n_{in} + n_{out}}}\right];$$

$$bias_{initialization} \sim N[mean=0, std=1];$$

where $n_{in}$ and $n_{out}$ are the number of input neurons and the number of output neurons, respectively.

S2132. Using one-hot coding to express five emotion polarity categories as a five-dimensional vector with only one item being 1 and the rest being all 0, the current emotion word to be predicted being $w_i$, and an emotion polarity vector $t_i = (t_{i1}, t_{i2}, t_{i3}, t_{i4}, t_{i5})$.

S2133. When training the lexical item emotion model, inputting the preceding text and the next text of the emotion word $w_i$ to be predicted, and outputting a probability distribution vector $$\hat{y}_i = (\widehat{y_{i1}}, \widehat{y_{i2}}, \widehat{y_{i3}}, \widehat{y_{i4}}, \widehat{y_{i5}})$$

of model-predicted $w_i$ emotion polarity.

S2134. Calculating the distance between $t_i$ and $\hat{y}_i$ by using a cross entropy loss function, $$L = -\sum_{k=1}^{5} y_{ik} \log(\widehat{y_{ik}}).$$

S2135. Using a gradient descent algorithm to update $weight_{initialization}$ and $bias_{initialization}$ parameters iteratively, and searching for a parameter value enabling the value of the cross entropy loss function to be minimum, an updating formula of the gradient descent algorithm for the first time being:

$$weight' = weight_{initialization} - \eta \nabla_w L;$$

$$bias' = bias_{initialization} - \eta \nabla_b L;$$

where weight' and bias' are the updated parameters, ρ is the learning rate, $\nabla_w L$ and $\nabla_b L$ are the gradients of the cross entropy loss function to the weight and threshold parameters.

S2136. Setting the accuracy threshold value as 95%, using the gradient descent algorithm to update iteration parameters until the sum of values of the cross entropy loss function of all the training samples is 5%, and obtaining parameters of weight and bias to complete training of the lexical item emotion model.

S22. Acquiring the word vector and the emotion polarity vector, calculating the similarity between the word vector and the emotion polarity vector, and fusing lexical item emotion polarities.

S221. Acquiring the word vector and the emotion polarity vector based on the lexical item emotion model and the weight parameter thereof, wherein the lexical item emotion model and the weight parameter thereof are loaded; according to the mapping relationship between the emotion lexical item and the integer index and the weight parameter, the word vector with emotion information is acquired, and imported into the lexical item emotion model; the emotion polarity vector is calculated and output according to a functional relationship showing the emotion polarity vector in the model.

S222. Using a similarity algorithm to calculate the similarity between the word vector and the emotion polarity vector, so that the similarity is divided into strong correlation, weak correlation and non-correlation according to the degree of similarity, wherein the word vector and the emotion polarity vector of the lexical item are loaded, the degree of similarity between the vectors is calculated by using the similarity algorithm, the similarity categories of the word vector and the emotion polarity vector are determined, and the similarity is set to three categories of strong correlation, weak correlation and negative correlation according to the positive and negative values and magnitude of a calculation result. The steps for calculating similarity are as follows.

S2221. Acquiring a word vector $e_j$ and an emotion polarity vector $q_j$ of an emotion word $w_j$.

S2222. Using a Pearson correlation coefficient to calculate the similarity between the word vector and the emotion polarity vector:

$$\rho(e_j, q_j) = \frac{\text{cov}(e_j, q_j)}{\sigma(e_j) \times \sigma(q_j)};$$

where cov is a covariance and σ is a standard deviation.

S2223. Dividing the degree of correlation according to the calculation result of the Pearson correlation coefficient of the two vectors:

$$\rho(e_j, q_j) \in \begin{cases} (0.6, 1], & \text{strong correlation} \\ [0, 0.6], & \text{weak correlation} \\ [-1, 0), & \text{negative correlation} \end{cases}$$

S223. According to the similarity category, using an arithmetic mean, weighted mean or adding method, respectively, to realize the fusion of the two vectors.

According to the similarity of the two vectors, if the two vectors are in strong correlation, the arithmetic mean method is used to calculate the emotion polarity information; if the two vectors are in weak correlation, the weighted mean method is used to process the emotion polarity information.

If the two vectors are in non-correlation, adding the word vector and the emotion polarity vector to obtain the emotion polarity information of the lexical item.

Taking the word vector $e_j$ and the emotion polarity vector $q_j$ of the emotion word $w_j$ as an example, the weighted mean method is:

$$wa = \frac{|e_j|}{|e_j| + |q_j|} e_j + \frac{|q_j|}{|e_j| + |q_j|} q_j;$$

in the formula, ‖ is the modulus length of the vector.

S23. Constructing a conditional vocoder to output new voices with emotion changes.

S231. Extracting voice features of a teacher by using fast Fourier transform, non-linear transform and a filter bank.

Figure 7:
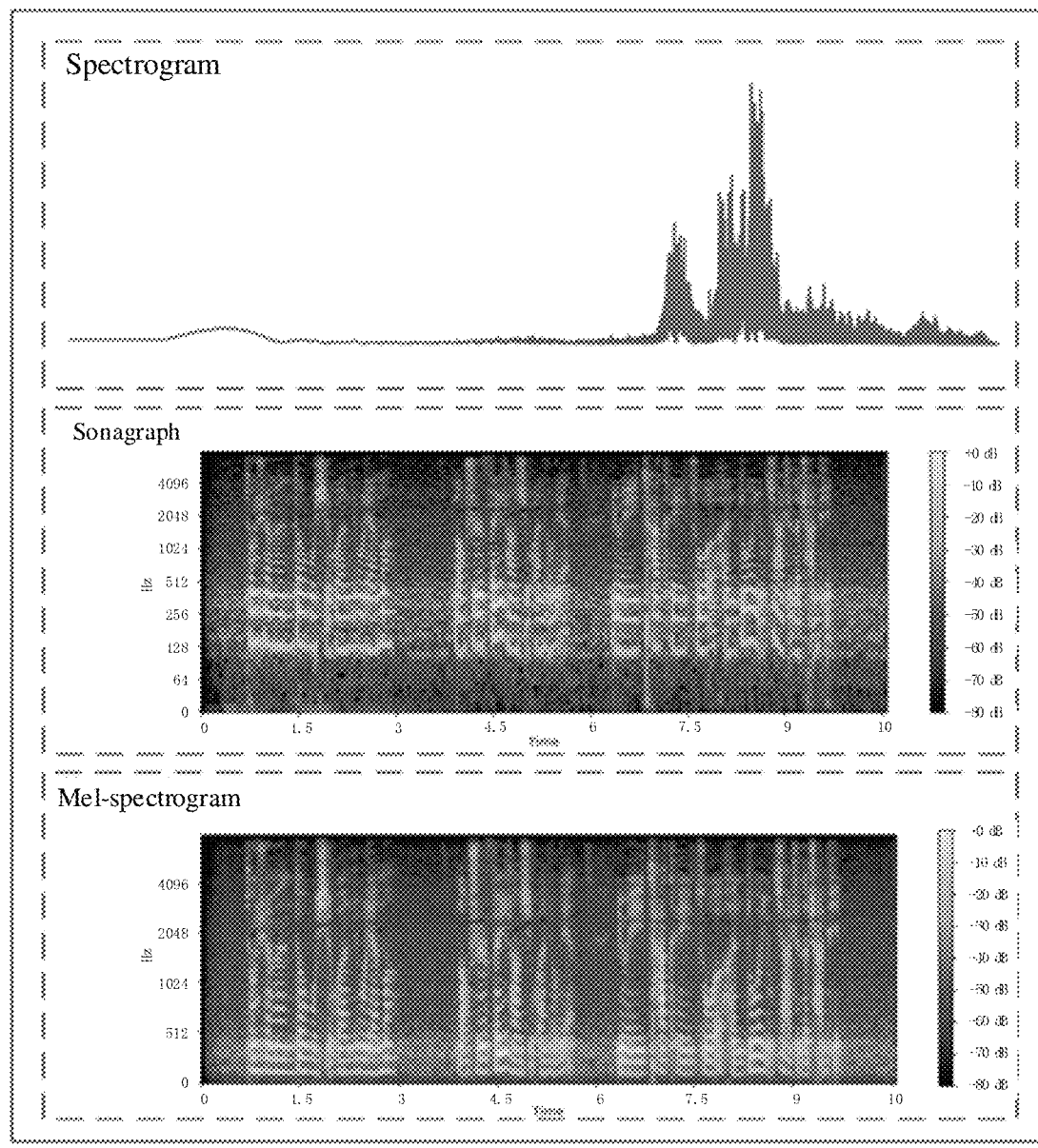
FIG. 7 is a schematic diagram of voice feature extraction according to the embodiments of the present disclosure.

Specifically, referring to FIG. 7, a voice sequence of the teacher is processed frame by frame by using fast Fourier transform, all frames of the voice sequence are stacked along the vertical dimension to obtain the amplitude and phase of the voice of the teacher, a sonogram is processed by using non-linear transform, the tone, pitch, timbre and rhythm changing features of the teacher in teaching activities are captured by using the filter bank, and intermediate features of a Mel-spectrogram are extracted.

S232. Using a recurrent neural network layer to extract the features of a vector sequence, and converting the lexical items into emotion features. According to the similarity between the word vector and the emotion polarity vector, an emotion vector is acquired by using the corresponding operation method, the lexical item sequence is converted into the emotion polarity vector sequence, the vector sequence sequence is extracted by using the recurrent neural network layer, the feature of the vector sequence is transformed non-linearly by using two fully-connected layers, and then the emotion feature is generated by compression.

In the present embodiment, the specific steps of acquiring the emotion feature are as follows.

S2321. Loading the sequence $\{w_1, w_2, \ldots, w_n\}$ of the lexical items of emotion words.

S2322. Acquiring the word vector and the emotion polarity vector of each emotion word in the lexical item sequence, calculating a similarity, and according to the calculation result, using a corresponding fusion mode to obtain the emotion vector sequence.

S2323. Using a recurrent neural network to extract the features of the emotion vector sequence, and outputting an emotion feature vector $h=\{h_1, h_2, \ldots, h_j\}$ after non-linear transformation by the two fully-connected layers and compression.

S233. Constructing the conditional vocoder based on emotion and voice features of the teacher to generate new voices with emotion changes.

Specifically, the emotion feature and voice features of the Mel-spectrogram are taken as the preconditions and input variables of a neural network vocoder respectively, and a conditional model of the vocoder is constructed; the emotion change and pitch and timbre feature are fused by the vocoder to generate the new voice with the emotion changes for subsequent voice synthesis.

Figure 8:
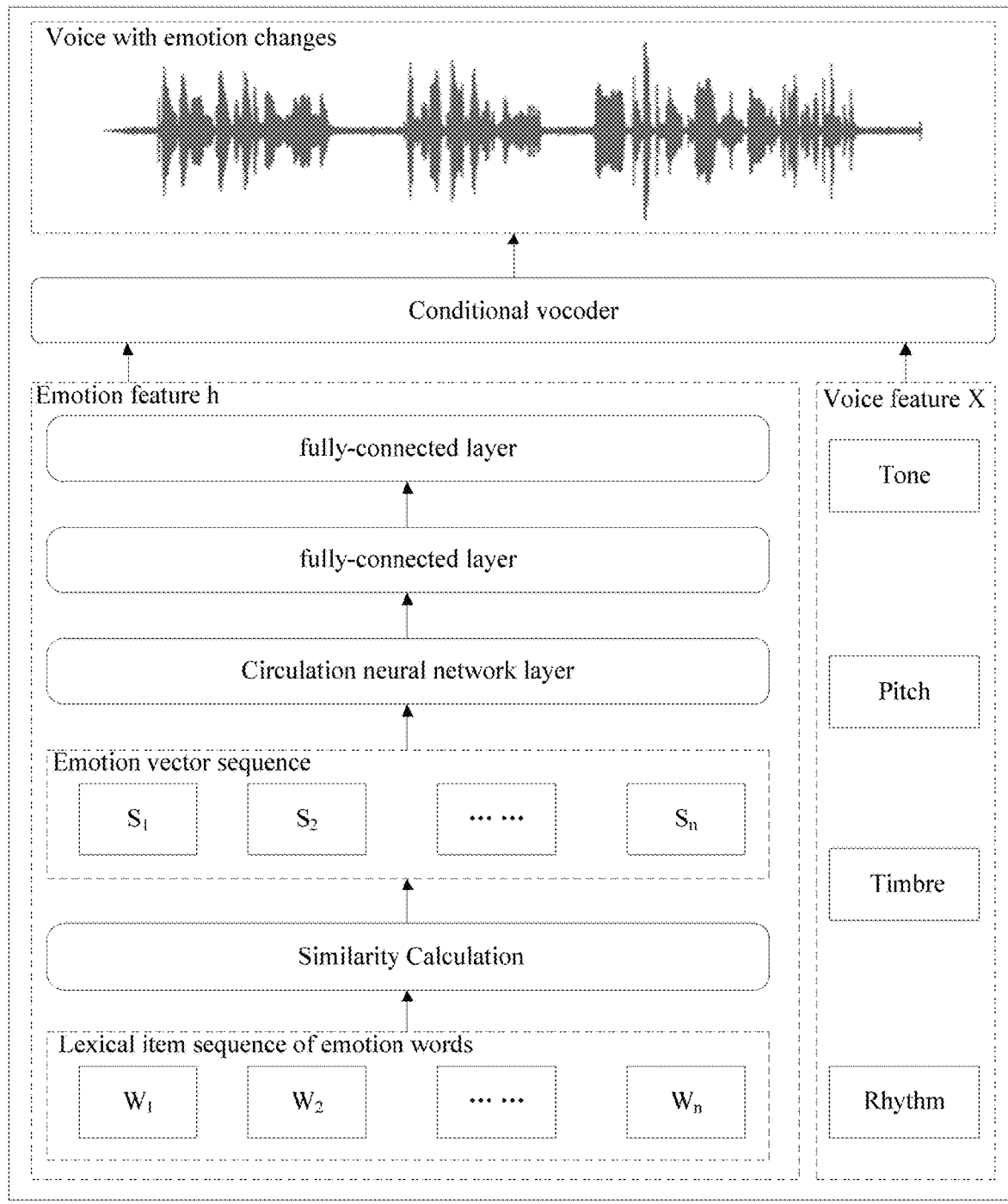
FIG. 8 is a flow diagram of voice emotion generation construction according to the embodiments of the present disclosure.

In the present embodiment, referring to FIG. 8, the specific steps of generating voice emotion are as follows.

S2331. Using the emotion feature vector $h=\{h_1, h_2, \ldots, h_j\}$ and a voice feature $x=\{x_1, x_2, \ldots, x_T\}$ of the Mel-spectrogram as the precondition and input of the vocoder respectively.

S2332. Having a conditional model formula for the vocoder:

$$p(x|h)=\Pi_{t+1}{}^{T}p(x_t|x_1,x_2,\ldots,x_{t-1},h);$$

where $x_t$ is the voice feature of the Mel-spectrogram at time t.

S2333. Having a calculating formula for fusing the emotion feature h and the voice feature x of the Mel-spectrogram:

$$z=\tanh(W_1{}^*x+V_1{}^T)\odot\sigma(W_2{}^*x+V_2{}^Th);$$

Where tanh is a tangent function, σ is a sigmoid function, ⊙ is a Khatri-Rao product, and $V_1$, $V_2$, $W_1$ and $W_2$ are weight parameters.

S3. According to the voice, obtaining a feature vector of voice rhythm information, and generating voice style features and coding states, obtaining text to be synthesized, and generating a simulated voice of the text to be synthesized according to the text to be synthesized and the voice style feature.

S31. Generating voice style features fused with text emotion information, and using a one-to-many recurrent neural network layer to mine multi-rhythm features in the voice to obtain a voice style coding state.

S311. Using a two-dimensional convolution neural network, batch normalization, a rectified linear unit, and a single-layer recurrent neural network layer to convert the rhythm information into a rhythm feature vector.

Specifically, the two-dimensional convolution neural network is used to extract the voice features of the teacher and acquire the rhythm information of the tone, time domain distribution, stress and emotion. A batch standardization algorithm is used to process the multi-rhythm information in the voice. The single-layer recurrent neural network layer is used to extract the rhythm information and convert the same into the rhythm feature vector of a fixed dimension.

S312. Using the one-to-many recurrent neural network layer to mine the multi-rhythm feature in the voice, and assigning a feature weight to a style by using an attention mechanism to obtain a style coding vector.

Specifically, the number of voice style features required to be captured is set, the one-to-many recurrent neural network layer is used to mine the rhythm feature vector to acquire the tone, pitch, timbre, rhythm and emotion voice style features of a real teacher, the attention mechanism is applied to assign a high weight to prominent features of the voice style, the style features are added for operation, and the style coding vector is generated.

Figure 9:
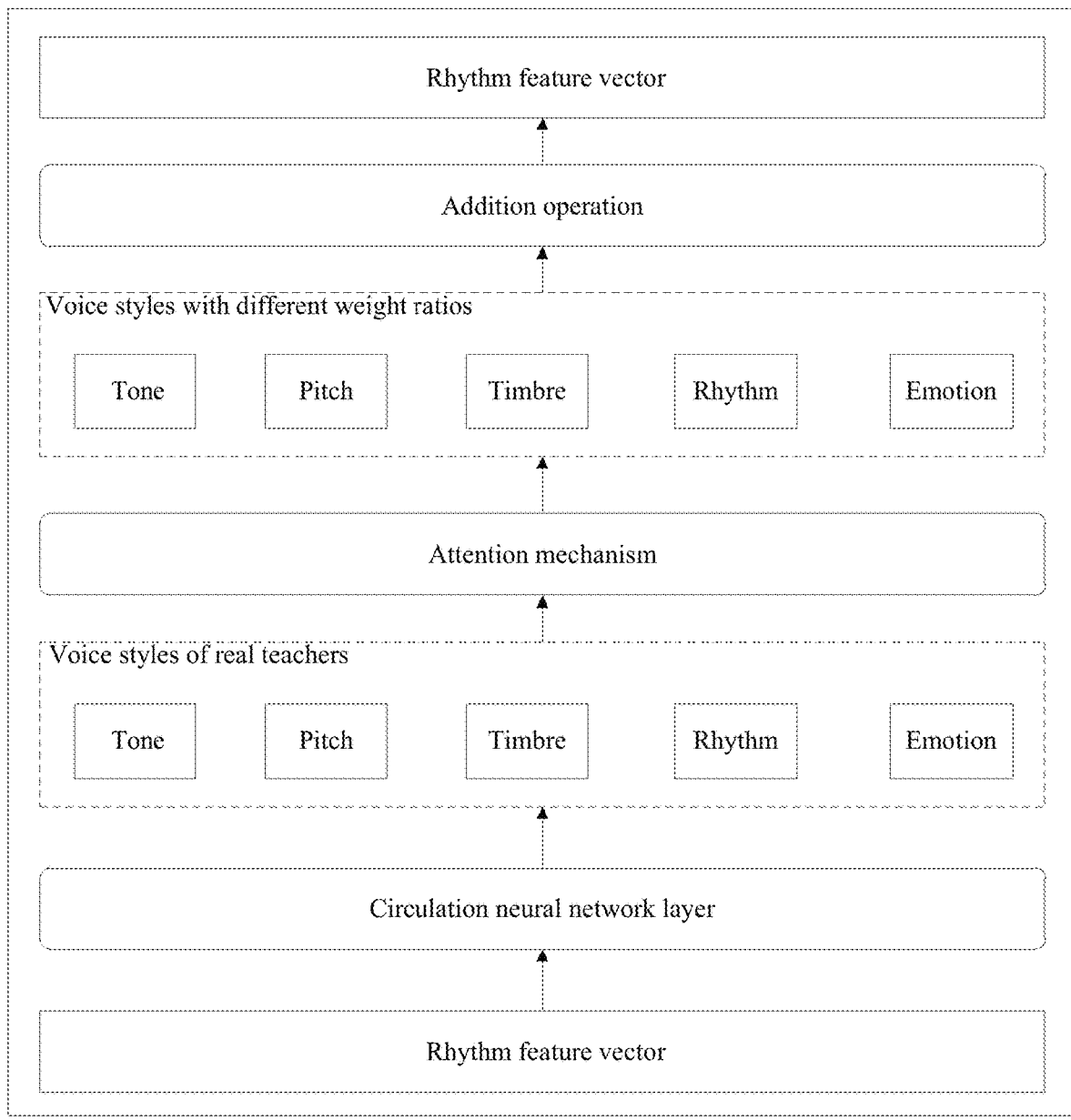
FIG. 9 is a flow diagram of voice style coding vector acquiring according to the embodiments of the present disclosure.

In the present embodiment, referring to FIG. 9, the specific steps of acquiring the voice style coding vector are as follows.

S3121. Acquiring a rhythm feature vector $pr=\{pr_1, pr_2,\ldots, pr_k\}$ containing the tone, time domain distribution, stress and emotion information.

S3122. Based on the tone, pitch, timbre, rhythm and emotion, constructing a five-dimensional feature voice style, taking the rhythm feature vector as an input variable of a one-to-many recurrent neural network, and outputting a feature vector $\{s_1, s_2, s_3, s_4, s_5\}$ of the voice style.

S3123. According to the features of the voice style of the teacher, using the attention mechanism to assign different weights to the five voice style features, a formula for calculating the feature weight of the voice style being:

$$[\alpha_1,\alpha_2,\alpha_3,\alpha_4,\alpha_5]=\text{softmax}([\text{score}(s_1,q),\text{score}(s_2,q),\\ \text{score}(s_3,q),\text{score}(s_4,q),\text{score}(s_5,q)])$$

where score is a scoring function and q is a query vector.

S3124. Multiplying five-dimensional variables of the voice style feature by the corresponding weights, adding the operation results, and outputting a style coding vector $\text{style}=\{\text{style}_1, \text{style}_2, \ldots, \text{style}_i\}$.

S313. Extracting the style coding vector, and generating the voice style features and the coding state thereof.

Specifically, the number of extraction modules is set, the fully-connected layer, batch standardization and the rectified linear unit are taken as a group of extraction modules, the dimension of an output coding state is set, and the extraction module is used to perform non-linear transformation and compression processing operation on the style coding vector so as to generate the coding state containing the voice style feature and having a fixed dimension.

S32. According to the modeling order, constructing a tone prediction model, and capturing tone fluctuation changes and converting the same into a tone feature coding state.

S321. According to the serialized modeling design specification and the modeling order, constructing the tone prediction model, wherein according to the serialized modeling design specification and the modeling order, the word embedding layer, a double-layer recurrent neural network layer, the fully-connected layer and the normalized exponential function are stacked, so that the tone prediction model is constructed; a tone training sample is input variables of the model, and the output of the model implies the probability distribution of the punctuation symbols of a rising tone, a falling tone and tone changes.

Figure 10:
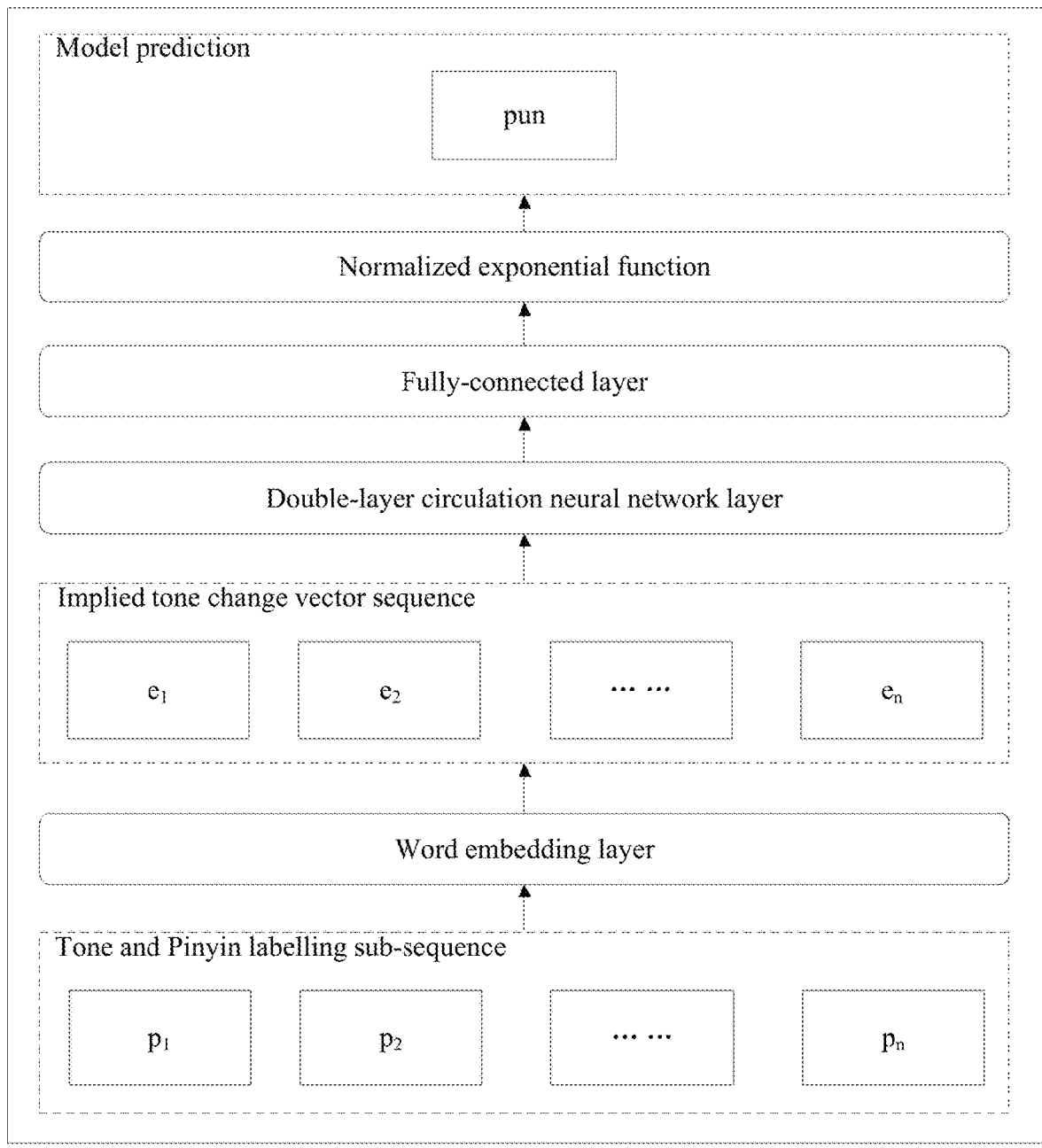
FIG. 10 is a flow diagram of tone prediction model construction according to the embodiments of the present disclosure.

In the present embodiment, referring to FIG. 10, the specific steps of constructing the tone prediction model are as follows.

S3211. Loading a Pinyin labeling sub-sequence $p=\{p_1, p_2,\ldots, p_n\}$ with tones.

S3212. Using the word embedding layer to convert the sub-sequence into a vector sequence $e=\{e_1, e_2, \ldots, e_n\}$ implying tone changes.

S3213. Using the double-layer recurrent neural network layer to capture the pitch and fluctuation change features of the tone in the vector sequence.

S3214. Using the features captured by non-linear transformation of the fully-connected layer and compression to obtain a probability distribution vector $pun=\{pun_1, pun_2,\ldots, pun_k\}$ of the corresponding punctuation symbols of the sub-sequence through processing of the normalized exponential function.

S322. Updating the weight parameters in the model by using a back-propagation algorithm, and mapping Pinyin sub-labels into a vector implying the tone features.

A text tone training set is used to train the tone prediction model, the error back-propagation algorithm is used to update the weight parameter in the model, and a predicted accuracy threshold value is set; when the accuracy of the tone prediction model reaches the threshold value, model training is stopped; according to the tone change of the Pinyin sub-sequence implied by the weight parameter in the word embedding layer, the weight parameter is used to map the sub-sequence into the feature vector containing the tone change.

In the present embodiment, the specific steps of the error back-propagation algorithm are as follows.

S3221. In the tone prediction model, making the input of the i-th layer and the output of the (i+1)-th layer be $x_i$ and $x_{i+1}$ respectively, the weight parameters of the two layers being respectively $w_i$ and $w_{i+1}$.

S3222. Defining a true output result as z, and calculating an error between a model predicted result and the true output result:

$$\delta = z - x_{i+1}.$$

S3223. Transferring the error from the (i+1)-th layer to the i-th layer through a chain rule, and respectively calculating the errors of the i-th layer and the (i+1)-th layer:

$$\delta_{i+1} = w_{i+1}\delta; \delta_i = w_i \delta_{i+1}.$$

S3224. Calculating weight parameters of the updated i-th layer and (i+1)-th layer respectively:

$$w_i = w_i + \eta \delta_i f x_i;$$

$$w_{i+1} = w_{i+1} + \eta \delta_{i+1} f x_{i+1};$$

where $\eta$ is the learning rate and $f$ is the derivative of an activation function.

S323. Using hole convolution to capture the tone fluctuation changes, and using the fully-connected layer to convert the tone fluctuation changes into a tone feature coding state with a fixed dimension.

Specifically, a hole cause and effect convolution neural network is used to capture the rule of fluctuation changes in the tone feature vector, the fluctuation changes of the tone are sequentially spliced and processed in the order of time steps, the splicing results are transformed non-linearly by the fully-connected layer, and the processing results are compressed into the tone feature coding state with the fixed dimension.

S33. Generating simulated voice features, wherein the attention mechanism is used to assign weights to the voice coding state and the tone coding state, and the coding states are fused through addition operation processing; according to the text to be synthesized and the simulated voice features, a voice sequence with the voice style and emotion features of the real teacher is generated and output.

S331. Using the double-layer recurrent neural network layer to mine text feature information, and outputting a feature vector of the text to be synthesized via the fully-connected layer and the rectified linear unit.

A neural network language model is used to convert the text to be synthesized into a text vector, and feature information in the text vector is mined by using the double-layer recurrent neural network layer to acquire the output result of the last time step, and the feature vector of the text to be synthesized is acquired through processing by a fully-connected layer and a rectified linear unit function.

In the present embodiment, the specific steps of obtaining the features of texts to be synthesized are as follows.

S3311. Obtaining texts to be synthesized $\{w_1, w_2, \ldots, w_n\}$.

S3312. Converting the texts to be synthesized into text vectors, i.e., text=$\{text_1, text_2, \ldots, text_n\}$ by using a neural network voice model.

S3313. Extracting the text vector features by adopting a double-layer recurrent neural network, and acquiring text structures and semantic features.

S3314. Processing the text features by using a fully-connected layer and a rectified linear unit function to obtain text feature vectors, i.e., $f=\{f1, f2, \ldots, fk\}$ to be synthesized.

S332. Multi-coding state fusion. The coding states of voice styles and tone features are acquired. According to the prominent voice styles and the degree of tone fluctuation changes in the voices of the real teachers, the weight is given to the coding state of each part by using the attention mechanism, the coding states of the above two features and corresponding weights thereof are calculated by adopting the addition operation, and the simulated voice features are acquired.

The coding states of the voice styles and the tone features are $s_{state}$ and $p_{state}$ respectively, and the weights given to the two coding states by using the attention mechanism are $weight_s$ and $weight_p$ respectively so the addition operation is:

$$feature = weight_s * s_{state} + weight_p * p_{state}$$

S333. Real teacher style voice generation. The texts to be synthesized and the simulated voice features are used as input variables, the style and prosody features of the voice sequence are acquired by combining multi-coding state fusion results in the voice synthesizer, and according to the emotion polarities of the teacher, the voice sequence with the voice style and emotion features of the real teacher is generated and outputted.

Embodiment II

Referring to FIG. 2, a terminal 1 for generating simulated voices of virtual teachers includes a memory 2, a processor 3, and a computer program stored on the memory 2 and runnable on the processor 3; and the processor 3 implements all steps of the above-mentioned method for generating simulated voices of virtual teachers according to the embodiment I when executing the computer program.

In summary, according to the method and the terminal for generating simulated voices of virtual teachers provided by the present disclosure, the voice samples of real teachers are collected, and after preprocessing, the preprocessing result is saved as a WAV file, and voice texts are obtained by adopting a voice conversion algorithm. The grammatical errors and spelling errors of the texts are corrected; stop words, punctuation marks and low-frequency lexical items are removed; the parts of speech of the lexical items are labeled; according to the emotion rules, the emotion polarities of the lexical items are labeled; and a set of punctuation marks with tone changes is defined in advance, and an automatic Chinese character tone labeling tool is developed for labeling Chinese Pinyin. According to the statistical results of lexical frequencies and the order of the lexical frequencies from big to small, the mapping relationship is constructed, and the lexical item emotion model is constructed. The emotion polarity training set is used to train the lexical item emotion model, and the training results and weight parameters are obtained. The similarity between the word vector and the emotion polarity vector is calculated, and the fusion of the word vector and the emotion polarity vector is realized according to the similarity category; the voice style and emotion features of real teachers are extracted, and thus, the conditional vocoder is constructed to generate the new voices with the emotion changes. The feature vector of voice rhythm information is extracted by using a combination method, the weight is given to the style feature by using the attention mechanism, the style coding vector is extracted, and the voice style feature and a coding state thereof are generated; the fluctuation changes of tones are captured by hollow convolution, the coding state of tone features is obtained, and the fusion coding state of voices and tones is processed by an addition operation; and according to the texts to be synthesized and the voice features of the real teacher, new voice sequences are generated and outputted. With the wide application of virtual teachers in classroom teaching, online teaching, campus activities and other teaching scenes, the demand for providing simulated voice synthesis services is increasingly urgent. The method and the terminal contribute to extracting and synthesizing the voice features and emotion styles of teaching administrators, teachers, and other related users, and satisfy the application requirements of high-quality virtual teachers.

The foregoing descriptions are merely preferred embodiments of the present application but are not intended to limit the patent scope of the present application. Any equivalent modifications made to the structures or processes based on the content of the specification and the accompanying drawings of the present application for direct or indirect use in other relevant technical fields shall also be encompassed in the patent protection scope of the present application.

What is claimed is:

1. A method for generating simulated voices of virtual teachers, comprising the following steps:
collecting real voice samples of teachers, converting the real voice samples into text sequences, and constructing a text emotion polarity training set and a text tone training set according to the text sequences;
constructing a lexical item emotion model based on lexical items in the text sequences, training the lexical item emotion model by using the text emotion polarity training set, calculating a similarity according to a word vector, an emotion polarity vector and a weight parameter obtained by training, extracting emotion features according to a similarity calculation result, and constructing voices with emotion changes based on the emotion features and voice features of the real voice samples; and
obtaining a feature vector of voice rhythm information according to the voices, generating voice style features, obtaining texts to be synthesized, extracting tone features of the texts to be synthesized by using the text tone training set, and generating the simulated voices of the texts to be synthesized based on the voice style features and the tone features.

2. The method for generating simulated voices of virtual teachers according to claim 1, wherein the converting the real voice samples into text sequences comprises:
denoising and editing the real voice samples, and then saving a processing result as a WAV file;
weighting and framing voice signals in the WAV files, and smoothing the voice signals by windowing; and
acquiring text sequences corresponding to the voice signals by using a voice conversion algorithm, filtering lexical items in the text sequences, and dividing the filtered text sequences into different paragraphs by using a segmentation algorithm.

3. The method for generating simulated voices of virtual teachers according to claim 1, wherein the constructing a text emotion polarity training set according to the text sequences comprises:
removing stop words, punctuation marks and low-frequency lexical items of lexical item sequences in the text sequences, correcting grammatical errors and spelling errors of the text sequences, and labeling the parts of speech of the lexical items;
acquiring emotion word lists and emotion rules of voices, and labeling the emotion polarities of the lexical items by combining the categories of the lexical items and context lexical items thereof; and
constructing the text emotion polarity training set according to the emotion polarities of the lexical items and context lexical items thereof.

4. The method for generating simulated voices of virtual teachers according to claim 2, wherein the constructing a text tone training set according to the text sequences comprises:
correcting punctuation marks of the text sequences divided into different paragraphs, and configuring corresponding tones for the corrected text sequences;
labeling the text sequences with Pinyin according to the tones of the text sequences; and
constructing the text tone training set according to the tones and Pinyin of the text sequences in different paragraphs.

5. The method for generating simulated voices of virtual teachers according to claim 1, wherein the constructing a lexical item emotion model based on lexical items in the text sequences, and training the lexical item emotion model by using the text emotion polarity training set comprise:
extracting lexical items containing emotion polarities from the text sequences, and constructing a mapping relationship between the lexical items and lexical frequencies based on the extracted lexical items and the lexical frequencies thereof;
constructing the lexical item emotion model based on a neural network and the mapping relationship between the lexical items and the lexical frequencies, and calculating word vectors according to the lexical item emotion model; and
training the lexical item emotion model by using the text emotion polarity training set to an emotion polarity vector and a weight parameter.

6. The method for generating simulated voices of virtual teachers according to claim 1, wherein the calculating a similarity according to a word vector, an emotion polarity vectors and a weight parameter obtained by training, and extracting emotion features according to a similarity calculation result comprise:
calculating the similarity between the word vector and the emotion polarity vector:

$$\rho(e_j, q_j) = \frac{\text{cov}(e_j, q_j)}{\sigma(e_j) \times \sigma(q_j)};$$

wherein cov represents a covariance, $\sigma$ represents a standard deviation, $e_j$ represents a word vector, and $q_j$ represents an emotion polarity vector;
determining a similarity category according to the similarity between the word vector and the emotion polarity vector, and fusing the word vectors and the emotion polarity vectors according to the similarity category; and
according to the similarity between the word vector and the emotion polarity vector, acquiring an emotion vector by a corresponding operation method, converting lexical item sequences into emotion polarity vector sequences, extracting the features of vector sequences by using a circulation neural network layer, nonlinearly transforming the features of the vector sequences by two fully-connected layers, compressing, and generating emotion features.

7. The method for generating simulated voices of virtual teachers according to claim 1, wherein the constructing voices with emotion changes based on the emotion features and voice features of the real voice samples comprises:

extracting the voice features of the real voice samples by using fast Fourier transform, nonlinear transform, and filter banks; and constructing a conditional model of a vocoder by taking the emotion features and the voice features as preconditions and input variables of the neural network vocoder, and using the vocoder to generate voices with emotion changes.

8. The method for generating simulated voices of virtual teachers according to claim 1, wherein the obtaining a feature vector of voice rhythm information according to the voices, and generating voice style features and coding states comprise:

converting the voice rhythm information into a rhythm feature vector by using a two-dimensional convolution neural network, batch standardization, a correction linear unit and a single-layer circulation neural network layer;

mining multi-rhythm features in the voices by using a pair of multi-cycle neural network layers, giving weights to style features by using an attention mechanism, and acquiring a style coding vector; and according to the style coding vector, generating voice style features and coding states thereof.

9. The method for generating simulated voices of virtual teachers according to claim 8, wherein the obtaining texts to be synthesized, extracting tone features of the texts to be synthesized by using the text tone training set, and generating the simulated voices of the texts to be synthesized based on the voice style features and the tone features comprise:

constructing a tone prediction model, training the tone prediction model by using the text tone training set, updating weight parameters in the tone prediction model by using an error back-propagation algorithm, and mapping Pinyin sub-labels to a vector with implied tone features;

capturing the fluctuation changes of tones by hollow convolution, and converting into a tone feature coding state with fixed dimensions by using a fully-connected layer;

mining text feature information by using a double-layer circulation neural network layer, and outputting feature vectors of the texts to be synthesized by the fully-connected connection layer and a modified linear unit; and giving weights to the coding states of voice style features and tone features by using an attention mechanism, fusing the coding states through addition operation processing, and according to the texts to be synthesized and simulated voice features, generating voice sequences with voice styles and emotion features.

10. A terminal for generating simulated voices of virtual teachers, comprising a memory, a processor, and a computer program stored on the memory and runnable on the processor, wherein the processor implements the method for generating simulated voices of virtual teachers according to claim 1 when executing the computer program.

* * * * *